(12) United States Patent
Pucheu-Marque

(10) Patent No.: US 7,649,863 B2
(45) Date of Patent: Jan. 19, 2010

(54) METHOD FOR ALLOCATING RADIO RESOURCES, BASE STATION FOR CARRYING OUT SUCH METHOD, AND SYSTEM INCORPORATING SAME

(75) Inventor: Gérard Pucheu-Marque, Verneuil sur-Seine (FR)

(73) Assignee: Eads Defence and Security Networks, Montigny le Bretonneux (FR)

( * ) Notice: Subject to any disclaimer, the term of this patent is extended or adjusted under 35 U.S.C. 154(b) by 523 days.

(21) Appl. No.: 10/024,849

(22) Filed: Dec. 18, 2001

(65) Prior Publication Data

US 2002/0089948 A1 Jul. 11, 2002

(30) Foreign Application Priority Data

Dec. 18, 2000 (FR) .................................. 00 16502

(51) Int. Cl.
*H04L 12/66* (2006.01)
*H04W 4/00* (2006.01)
*H04M 11/04* (2006.01)
*H04B 7/00* (2006.01)

(52) U.S. Cl. ..................... 370/331; 370/335; 370/337; 370/342; 370/347; 370/352; 455/404.2; 455/521

(58) Field of Classification Search ......... 370/328–468; 455/404.1–521, 335
See application file for complete search history.

(56) References Cited

U.S. PATENT DOCUMENTS

| 5,038,342 | A | * | 8/1991 | Crisler et al. ................ 370/307 |
| 5,604,744 | A | * | 2/1997 | Andersson et al. ........... 370/347 |
| 5,625,623 | A | * | 4/1997 | Kent et al. .................... 370/280 |
| 5,740,166 | A | * | 4/1998 | Ekemark et al. ............. 370/331 |
| 5,757,789 | A | * | 5/1998 | Dent ............................ 370/337 |
| 5,768,276 | A | * | 6/1998 | Diachina et al. ............. 370/432 |
| 5,778,316 | A | * | 7/1998 | Persson et al. ............... 455/434 |
| 5,787,076 | A | * | 7/1998 | Anderson et al. ............ 370/294 |
| 5,799,010 | A | * | 8/1998 | Lomp et al. .................. 370/335 |
| 5,826,188 | A | * | 10/1998 | Tayloe et al. ................. 455/428 |
| 5,841,764 | A | * | 11/1998 | Roderique et al. ........... 370/310 |
| 5,845,215 | A | * | 12/1998 | Henry et al. ............... 455/426.1 |
| 5,878,036 | A | * | 3/1999 | Spartz et al. ................. 370/335 |
| 5,903,552 | A | * | 5/1999 | Raith .......................... 370/337 |
| 5,987,331 | A | * | 11/1999 | Grube et al. ................. 455/509 |
| H001837 | H | * | 2/2000 | Fletcher et al. .............. 455/433 |
| 6,073,005 | A | * | 6/2000 | Raith et al. ............... 455/404.1 |

(Continued)

OTHER PUBLICATIONS

Preliminary French Search Report Appl. No. FR 0016502; dated Aug. 3, 2001.

*Primary Examiner*—Salman Ahmed
*Assistant Examiner*—Venkatesh Haliyur
(74) *Attorney, Agent, or Firm*—McCracken & Frank LLP

(57) ABSTRACT

Method for allocating radio resources for the establishment of an outgoing call originating from a mobile terminal of a first system for radiocommunications with mobiles having a given radio interface and a mutual help channel, via a base station of a second system for radiocommunications with mobiles having a given radio interface which is incompatible with the radio interface of the first system. The base station monitores the mutual help channel of the first system. In case of detection, by the base station, of a given pattern transmitted by the mobile terminal on the mutual help channel, by the base station allocates a traffic channel emulating the radio interface of the first system, for communication with the mobile terminal.

11 Claims, 6 Drawing Sheets

U.S. PATENT DOCUMENTS

| | | | |
|---|---|---|---|
| 6,115,596 A * | 9/2000 | Raith et al. | 455/404.2 |
| 6,130,886 A * | 10/2000 | Ketseoglou et al. | 370/347 |
| 6,144,653 A * | 11/2000 | Persson et al. | 370/337 |
| 6,154,661 A * | 11/2000 | Goldburg | 455/562.1 |
| 6,216,004 B1 * | 4/2001 | Tiedemann et al. | 455/442 |
| 6,317,592 B1 * | 11/2001 | Campana et al. | 455/412.1 |
| 6,438,117 B1 * | 8/2002 | Grilli et al. | 370/331 |
| 6,456,858 B1 * | 9/2002 | Streter | 455/552.1 |
| 6,477,362 B1 * | 11/2002 | Raith et al. | 455/404.1 |
| 6,535,497 B1 * | 3/2003 | Raith | 370/336 |
| 6,539,237 B1 * | 3/2003 | Sayers et al. | 455/555 |
| 6,603,971 B1 * | 8/2003 | Mohebbi | 455/437 |
| 6,625,132 B1 * | 9/2003 | Boettger et al. | 370/329 |
| 6,633,754 B1 * | 10/2003 | Raith | 455/404.1 |
| 6,735,432 B1 * | 5/2004 | Jarett et al. | 455/417 |
| 6,788,656 B1 * | 9/2004 | Smolentzov et al. | 370/328 |
| 6,961,329 B1 * | 11/2005 | Bender et al. | 370/342 |
| 7,009,936 B1 * | 3/2006 | Kangas et al. | 370/229 |
| 2001/0049281 A1 * | 12/2001 | Duplessis et al. | 455/422 |
| 2002/0077151 A1 * | 6/2002 | Matthews et al. | 455/561 |

\* cited by examiner

METHOD FOR ALLOCATING RADIO RESOURCES, BASE STATION FOR CARRYING OUT SUCH METHOD, AND SYSTEM INCORPORATING SAME

TECHNICAL FIELD

The present invention relates to a method for allocating radio resources, in particular for establishing an outgoing call in a system for radiocommunications with mobiles, as well as a base station for carrying out such a method, and a system for radiocommunications with mobiles incorporating such a base station.

It pertains to the field of systems for radiocommunication with mobiles (hereinafter referred to as mobile radio systems) and more especially of private systems for professional radiocommunications, such as those intended for the public safety agencies (police, fire brigade).

BACKGROUND OF THE INVENTION

Various systems of this type frequently coexist over contiguous and/or partially overlapping but not totally overlapping geographical areas. For example, in a country having a federal type administrative organization, as is the case in the United States of America, the decisions regarding the deployment of radiocommunications systems for the police, for example, can be taken in an unconcerted and/or uncoordinated manner in bordering states. Nevertheless, the users, in this instance the police agencies of the states, must be able to carry out joint operations such as for example the pursuit of a villain fleeing from one state to another. For this reason, interoperability between various systems is necessary.

The invention aims to propose a solution to allow the interoperability between two mobile radio systems having mutually incompatible respective radio interfaces.

Each system comprises on the one hand mobile terminals such as portable terminals (installed on board a vehicle) and/or terminals which can be carried (by a user) and on the other hand a fixed infrastructure (network) comprising base stations distributed over the geographical area covered by the system and equipment for interconnection between the base stations and the fixed infrastructure of another system. The radio interface of a mobile radio system designates the set of protocols and of specifications which govern the exchange of radio signals between the base stations and the mobile terminals of the system. The characteristics of the radio interface are given, in particular, by the frequency band used, the width of the spectrum of the radio signals, the type of modulation, the type of coding of the information, the frame structure, etc.

Conventionally, a call originating from a mobile terminal intended for another terminal, mobile or fixed, is referred to as an outgoing call. The term "outgoing" is therefore to be regarded from the point of view of the mobile terminal from which the call originates.

In what follows, the case illustrated in FIG. 1 of a first and of a second mobile radio system is considered. The first system comprises on the one hand a network R1 having at least one base station BTS1, and on the other hand at least one mobile terminal TR1. The base station BTS1 and the mobile terminal TR1 can exchange radio signals via a radio interface I1. The second mobile radio system comprises on the one hand a network R2 having at least one base station BTS2, and on the other hand at least one mobile terminal TR2. The base station BTS2 and the mobile terminal TR2 can exchange radio signals over a radio interface I2. The base stations BTS1 and BTS2 of the networks R1 and R2 respectively are linked in a wire manner to an inter-system interface ISI carrying out the interconnection of the networks R1 and R2. Such an interface will be able to carry out a trans-encryption and/or trans-vocoding operation when the modes of encryption and/or of vocoding of the first and second systems are mutually incompatible.

In one example, the second system is regarded as constituting a new version or new generation, of the first system. In this example, the first system is moreover regarded as being the Project 25 system of the APCO (standing for "Association of Public-Safety Communications Officials-International, Inc."). The second system therefore consists, in this example, of a new generation of the Project 25 system. This is why, in what follows, the first system will sometimes be referred to as Project 25—Phase I or old generation system, whereas the second radiocommunications system will sometimes be referred to as Project 25—Phase II or new generation system.

In order to improve the spectral efficiency, the Project 25—Phase II system uses channels whose equivalent bandwidth is equal to 6.25 kHz per voice communication, as replacement for the channels of the Project 25—Phase I system whose equivalent bandwidth is equal to 12.5 kHz per voice communication. This system may for example be a TDMA system of order 2, the physical channels with a width of 12.5 kHz being able to carry two simultaneous voice communications so as to obtain a total efficiency of 6.25 kHz per communication. For this reason, and for others, the characteristics of the radio interface I2 of the Project 25—Phase II system are different from the radio interface I1 of the Project 25—Phase I system. It follows from this that the radio interface I2 is incompatible with the radio interface I1.

In the configuration illustrated in FIG. 1, the mobile terminal TR1 is in the area of coverage of the network R1, and more particularly of the base station BTS1 of the old generation system. Moreover, the mobile terminal TR2 is in the area of coverage of the network R2 and more particularly of the base station BTS2 of the new generation system. When the mobile terminal TR1 wishes to enter into communication with the mobile terminal TR2, it sets up a communication with the base station BTS1 according to the protocol of the radio interface I1. The call is then processed by the network R1 so as to be routed to the inter-system interface ISI, since the network R1 recognizes a call intended for a terminal belonging to the new generation system, owing, for example, to the fact that the call numbers identifying the terminals of this system possess a characteristic prefix. The network R2 of the new generation system receives an incoming call on the inter-system interface ISI intended for the mobile terminal TR2. It sets up this call, via the base station BTS2, according to the protocol of the radio interface I2 of the new generation system. Call set-up is thus carried out simply. Specifically each mobile terminal, in particular the calling mobile terminal TR1, is in the area of coverage of the network of the system to which it belongs. The exchange of voice data can then take place between the terminal TR1 and the terminal TR2, possibly with an operation of trans-encryption and/or of trans-vocoding in the inter-system interface ISI.

Nevertheless it may happen that a mobile terminal exits the area of coverage of the network of the system to which it belongs.

Thus, in the configuration illustrated in FIG. 2, the terminal TR2 of the new generation system S2 has left the area of coverage of the network R2 of the new generation system and is in the area of coverage of the network R1 of the old generation system, and more particularly of the base station BTS1 of this system. This configuration still does not raise any problem in respect of the establishment of a call originating from the terminal TR2 intended for the terminal TR1. Indeed, the terminal TR2 of the new generation system is in general capable of using the radio interface I1 of the old generation system. In fact it comprises means for emulating this interface. Interoperability between the two systems is then obtained in a simple and efficient manner.

Nevertheless, a problem arises in the reverse configuration, illustrated in FIG. 3, according to which a terminal TR1 of the old generation system has left the area of coverage of the network R1 of this system and is in the area of coverage of the network R2 of the new generation system, and more particularly of the base station BTS2 of this system. Specifically, the terminal TR1 being of an old generation, it cannot use the radio interface I2 of the new generation system.

One solution would consist in permanently dedicating, in the new generation system, resources necessary for the emulation of the radio interface I1 of the old generation system. In the case of an FDMA (standing for "Frequency Division Multiple Access") type system, such as the Project 25 system, such resources would consist of a conventional physical channel set up permanently on one of the frequencies specific of each base station of the new generation system, such as the base station BTS2. This solution is nevertheless inconceivable since it excessively penalizes the spectral efficiency of the new generation system. In particular, for base stations installed in a rural area, and for which in principle just two traffic physical channels are sufficient, this solution would represent a 50% overhead in terms of resources dedicated to interoperability. These resources being necessary on average in only 1% of cases, this overhead is prohibitive.

SUMMARY OF THE INVENTION

In order to allow interoperability between two mobile radio systems without incurring this drawback, the invention proposes a method for allocating radio resources for the establishment of an outgoing call originating from a mobile terminal of a first system for radiocommunications with mobiles having a given radio interface and a mutual help channel, via a base station of a second system for radiocommunications with mobiles having a given radio interface which is incompatible with the radio interface of the first system. The base station carries out the steps of:

a) monitoring said mutual help channel of the first system; and
b) in case of detection, by the base station, of a given pattern transmitted by the mobile terminal on said mutual help channel, allocating a traffic channel which emulates the radio interface of the first system, for communication with the mobile terminal.

The carrying out of the method according to the invention by the base stations of the second system then allows this system to ensure interoperability with the first system without it being necessary to dedicate corresponding resources outside of the periods during which they are necessary.

Another aspect of the invention relates to a base station, comprising means for allocating radio resources for the establishment of an outgoing call originating from a mobile terminal of a first system for radiocommunications with mobiles having a given radio interface and a mutual help channel, via a base station of a second system for radiocommunications with mobiles having a given radio interface which is incompatible with the radio interface of the first system. Said means for allocating comprise means for monitoring said mutual help channel of the first system, and means for allocating a traffic channel emulating the radio interface of the first system, for communication with the mobile terminal in case of detection of a given pattern transmitted by the mobile terminal on said mutual help channel.

Still another aspect of the invention relates to a system for radiocommunications with mobiles having a first given radio interface and comprising at least one base station. The base station has means for allocating radio resources for the establishment of an outgoing call originating from a mobile terminal of another system for radiocommunications with mobiles having a second given radio interface which is incompatible with said first given radio interface, and having a mutual help channel. The means for allocating comprise:

a) means for monitoring said mutual help channel of the other system; and
b) means for allocating a traffic channel emulating the radio interface of the other system, for communication with the mobile terminal in case of detection of a given pattern transmitted by the mobile terminal on said mutual help channel.

DESCRIPTION OF PREFERRED EMBODIMENTS

The invention is described hereinbelow in a non-limiting exemplary embodiment, intended to ensure the interoperability of a new private system for professional radiocommunications with the Project 25 system of the APCO. In this example, in fact, the new system is for example the new version of the Project 25 system, hereinbelow the old generation system or Project 25—Phase I system. This is why, in what follows, the new system will sometimes be referred to as the new generation system or Project 25—Phase II system. Of course, the reader will appreciate that the invention applies in a general manner to any mobile radio system if it is necessary to ensure the interoperability of this system with another mobile radio system, the two systems having mutually incompatible respective radio interfaces.

The Project 25—Phase I system is a system operating by frequency division multiple access (FDMA). The Project 25—Phase II system considered in this description is for example of the TDMA type of order 2 in a physical channel of width identical to that of the Project 25—Phase I system, that is to say 12.5 kHz. These two systems each comprise mobile terminals and base stations. The latter form part of the fixed infrastructure (network) of the system.

For each base station is defined, on a particular frequency, a downlink control physical channel devoted to the transmission of control information from the base station to the mobile terminals in its area of coverage (cell). Symmetrically, an uplink control physical channel is defined on another particular frequency for the transmission of control information from the mobile terminals to the base station. These control physical channels are subdivided into control logical channels by time-division multiplexing.

Likewise, for each base station are defined, on respective particular frequencies, downlink traffic physical channels intended for the transmission of data (voice or other) from the base station to a particular terminal in its area of coverage. Symmetrically, uplink physical channels are defined on other respective particular frequencies for the transmission of data (voice or other) from a mobile terminal to the base station. These traffic physical channels are respectively allocated by the base station to the communication with a given mobile terminal, during a call set-up procedure. Associated signalling logical channels are moreover provided, by time-division multiplexing, on the traffic physical channels, for the transmission of signalling information during the communication. The Project 25—Phase I system furthermore possesses, like numerous known private systems, a mode of operation in which the physical channel, in so-called "conventional" mode, is used alternatively as control channel and as traffic channel.

Figure 4A:
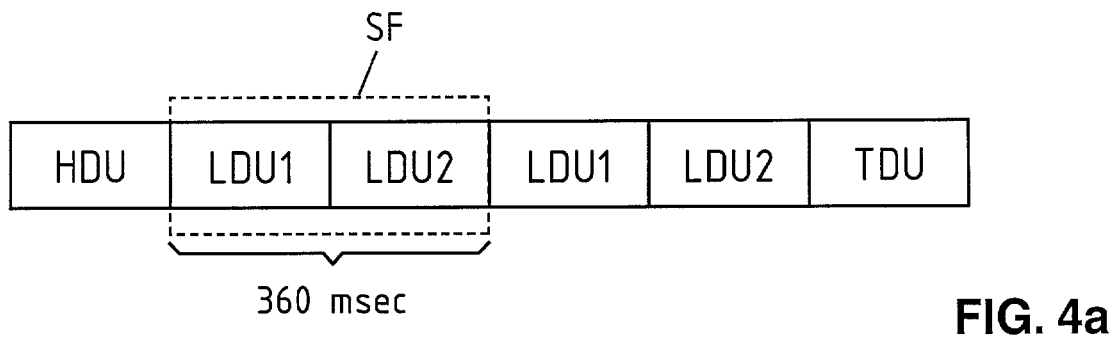
FIGS. 4a to 4c are charts illustrating the frame structure of messages transmitted on traffic physical channels of the Project 25—Phase I system.

Represented in the chart of FIG. 4a is the frame structure of voice messages transmitted on the traffic physical channels of the Project 25—Phase I system.

The voice messages are transmitted in the form of data units with a bit rate of 9.6 kbps (kilobits per second). There are five different data units.

A voice message firstly comprises a header data unit HDU. It furthermore comprises at least one data unit LDU1 (standing for "Logical link Data Unit 1") and a data unit LDU2 (standing for "Logical link Data Unit 2") which are alternated. The complete transmission of a data unit LDU1 or LDU2 lasts 180 ms (milliseconds). Finally, it comprises a Terminal Data Unit TDU. Furthermore, a data unit LDU1 followed consecutively by a data unit LDU2 form another data unit referred to as a superframe SF, whose complete transmission lasts 360 ms. The number of data units LDU1 and LDU2 contained in the message depends of course on the volume of the data to be transmitted.

Each data unit comprises as preamble a frame synchronization sequence FS and a network identifier NID. The sequence FS comprises 48 bits and serves to indicate the position of the first bits of the data unit. It is inserted periodically into the message, every 180 ms, so as to allow the receiver to pick up the message being transmitted. It is easily recognizable and has a duration of 15 ms. As far as the identifier NID is concerned, it comprises 64 bits and allows the receiver to elude the interference between channels of various systems operating in the same frequency band, known as "co-channel interference".

Figure 4B:
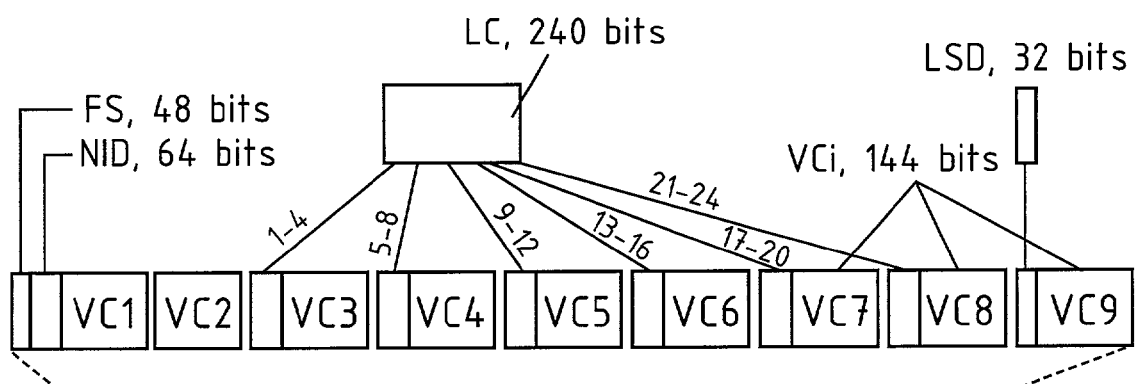
Figure 4C:
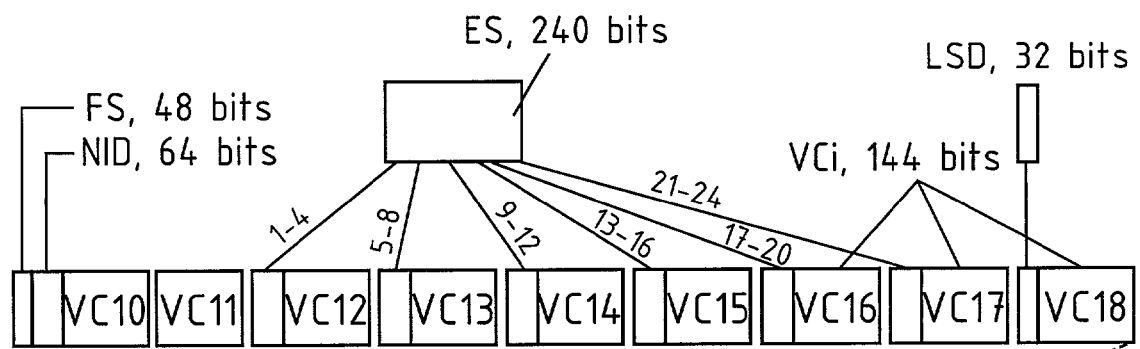

The charts of FIGS. 4b and 4c show the structure of the data units LDU1 and LDU2 respectively.

Each of these data units comprises nine words ("voice code words") respectively denoted VC1 to VC9 for the data unit LDU1, and VC10 to VC18 for the data unit LDU2. The duration d1 of transmission of each word is equal to 20 ms (d1=20 ms). The synchronization sequence FS and the network identifier NID are contained in the word VC1 and in the word VC10 of the data units LDU1 and LDU2 respectively. Stated otherwise, the periodicity of transmission of the synchronization sequence FS is equal to K.d1, with K=9, that is to say to 180 ms as indicated above.

Furthermore, 24 Hamming words of 10 bits each, totalling 240 bits, are contained in each of the words VC3 to VC8 of the data unit LDU1 and in each of the words VC12 to VC17 of the data unit LDU2. In the data unit LDU1, these 24 words form a link control sequence LC (standing for "Link Control") which contains information for identifying the call. It is, for example, a code identifying the calling party, a code identifying the called party, as the case may be, a code identifying the call group to which they belong, a bit indicating whether the call is an emergency call, etc. In the data unit LDU2, these 24 words form a sequence ES (standing for "Encryption Sync") which contains information for identifying the type of synchronization and the type of encryption which are employed.

Moreover, four bytes totalling 32 bits are transmitted in the word VC9 and in the word VC18 of the data units LDU1 and LDU2 respectively, so as to form a datastream LSD (standing for "Low Speed Data"). This datastream is reserved for applications individual to the user, which are not provided for by the standard defining the radio interface of the Project 25—Phase I system. Given the type of coding used for these data, this datastream exhibits a bit rate of 88.89 bps (bits per second).

Finally, 24 Status Symbols SS are inserted into the data units LDU1 and LDU2, at a rate of one symbol of two bits every 70 bits transmitted.

More details regarding the frame structure of voice messages or data messages according to Project 25—Phase I can be obtained by consulting the TIA/EIA-102. BAAA standard "Project 25 FDMA, Common Air Interface, New Technology Standards Project, Digital Radio Technical Standards", May 1998, published by the TIA ("Telecommunications Industry Association").

Figure 5:
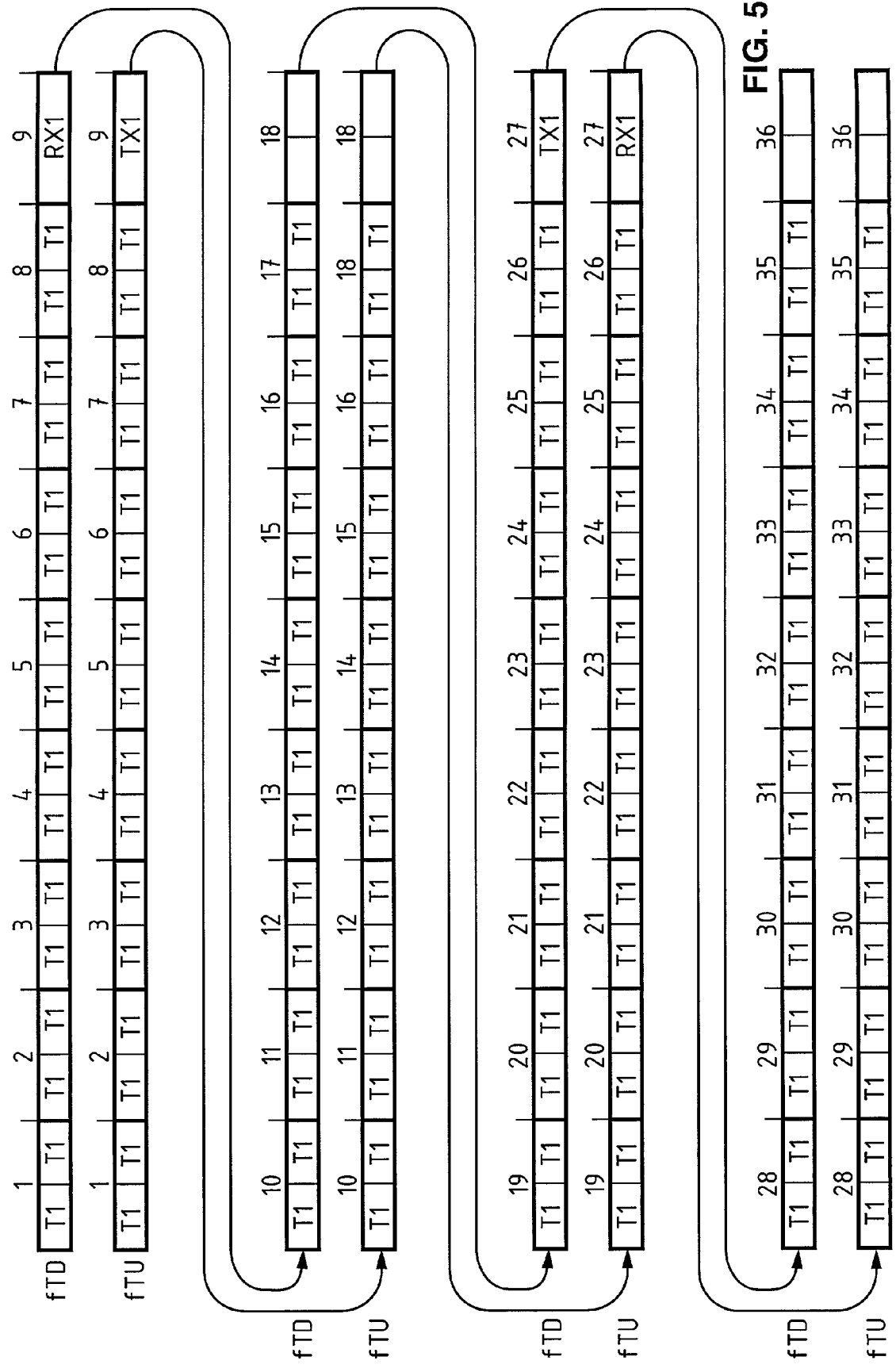
FIG. 5 is a chart illustrating the frame structure of messages transmitted on traffic physical channels of the mobile radio system according to the invention.

FIG. 5 diagrammatically represents the frame structure of a traffic channel of the new generation system according to the invention.

Represented in this figure, juxtaposed along the vertical, are on the one hand the structure of a frame of the uplink traffic physical channel set up on a frequency $f_{TU}$, and on the other hand the structure of a frame of the downlink traffic physical channel set up on a frequency $f_{TD}$. The main characteristic of the traffic channel is that it has a periodic frame structure which is a multiple of the duration K'.d1 of a segment composed of K' elementary timeslots each having a duration d1=20 ms, with K'=18. This duration K'.d1 is precisely equal to the duration of a structure of a superframe FS of the control channel of the Project 25—Phase I system, i.e. 360 ms. Specifically, K'=2.K.

A frame of the traffic physical channel thus comprises four such segments, represented one above the other in FIG. 5. Stated otherwise, a segment corresponds to a quarter of a frame. Each segment is composed of K'/2=9 composite timeslots each having a duration d2=40 ms, each comprising two consecutive elementary timeslots of duration d1=20 ms. In the figure, the numbers indicated above the frames correspond to the composite slot numbers.

For the first segment (at the top in FIG. 5), the first sixteen elementary timeslots, denoted T1, are reserved for the transmission of traffic information in the uplink direction on the frequency $f_{TU}$ or in the downlink direction on the frequency $f_{TD}$. Furthermore, on each of the frequencies $f_{TU}$ and $f_{TD}$, the last two elementary timeslots, i.e. the ninth composite timeslot, are reserved for the transmission of signalling information. Thus, on the frequency $f_{TU}$, the recurrence of these timeslots forms an associated signalling channel denoted TX1, for the transmission of uplink signalling information from the mobile terminals in the transmission phase. This signalling information can refer for example to requests to change cell (for carrying out a handover). Likewise, on the frequency $f_{TD}$, the recurrence of these timeslots forms an associated signalling channel denoted RX1, for the transmission of downlink signalling information to the mobile terminals in the reception phase. This signalling information can refer for example to the identification (colour codes) of the neighbouring cells, so as to allow the terminals in the reception phase to choose a new cell if the conditions of reception deteriorate.

For the third segment, the first sixteen elementary timeslots, denoted T1, are also reserved for the transmission of traffic information in the uplink direction on the frequency $f_{TU}$ or in the downlink direction on the frequency $f_{TD}$. Furthermore, on each of the frequencies $f_{TU}$ and $f_{TD}$, the last two elementary timeslots, i.e. the ninth composite timeslot, are reserved for the transmission of signalling information. Thus, on the frequency $f_{TU}$ the recurrence of these timeslots forms an associated signalling channel denoted RX1, for the transmission of uplink signalling information from the mobile terminals in the reception phase. This signalling information may refer for example to random access of the mobile terminal so as to request the right to talk, or else to responses to enquiries made by the base station so as to monitor the presence of terminals. Likewise, on the frequency $f_{TD}$, the recurrence of these timeslots forms an associated signalling channel denoted TX1, for the transmission of downlink signalling information to the mobile terminals in the transmission phase. This signalling information may refer for example to the control of the transmission power by the mobile terminal so as to limit interference over the whole of the network or else to commands to cease transmission should the traffic channel be subjet to pre-emption by a terminal of higher priority.

For the second and for the fourth segment, the first sixteen elementary timeslots, denoted T1, are again reserved for the transmission of traffic information in the uplink direction on the frequency $f_{TU}$ or in the downlink direction on the frequency $f_{TD}$. Furthermore, on each of the frequencies $f_{TU}$ and $f_{TD}$, the last two elementary timeslots, i.e. the ninth composite timeslot, are reserved for the monitoring, by the base station and/or by the terminals, of other physical channels of the system.

Figure 6:
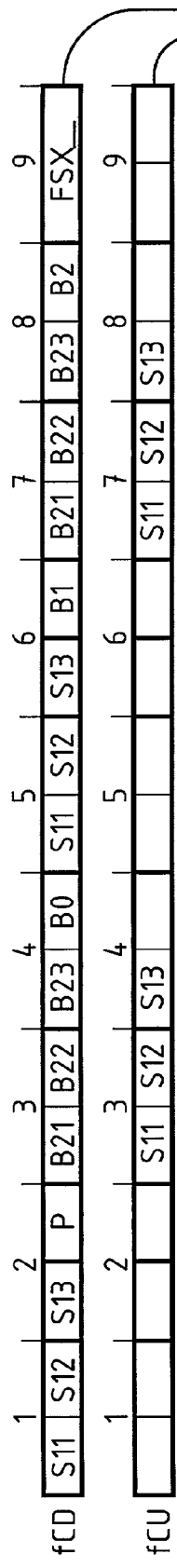
FIG. 6 is a chart illustrating an exemplary frame structure of messages transmitted on control physical channels of a mobile radio system according to the invention.
Figure 6:
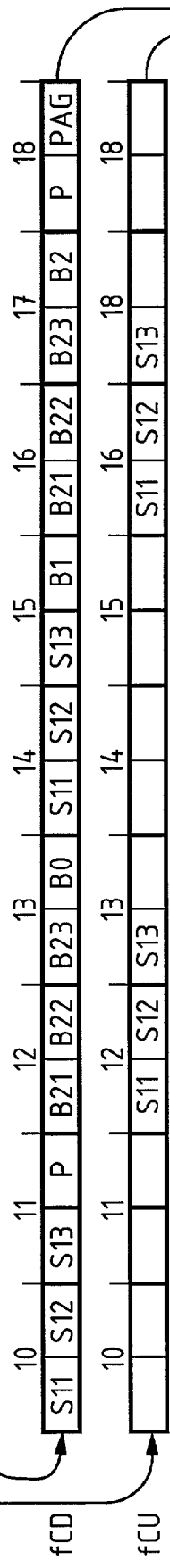
Figure 6:
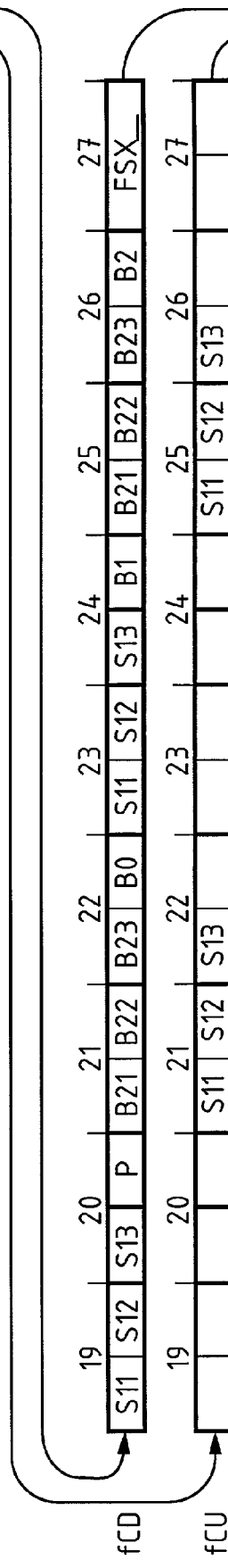
Figure 6:
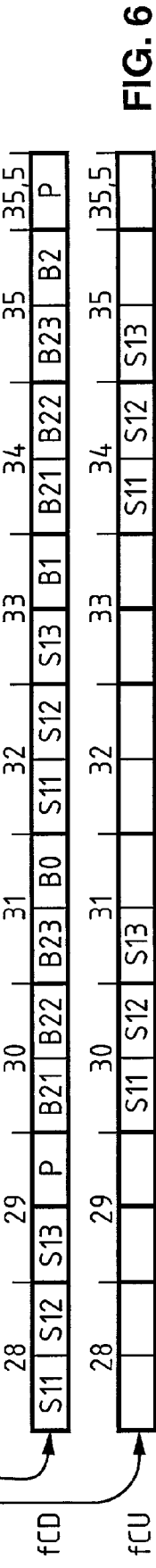

FIG. 6 diagrammatically represents the frame structure of the channel for controlling a base station of the new generation system according to the invention.

Represented in the figure, juxtaposed along the vertical, are on the one hand the frame structure on the uplink control physical channel set up on a frequency $f_{CU}$, and on the other hand the frame structure on the downlink control physical channel set up on a frequency $f_{CD}$. The frame structures are periodic. In order to allow monitoring of the channels of the neighbouring cells similar to the monitoring used by the GSM system (standing for Global System for Mobile communications), the frame on the control physical channel (uplink or downlink) is of a duration of K" elementary timeslots each having a duration d1=20 ms, with K' and K" mutually prime. In the example K"=71, so that this condition is satisfied. Stated otherwise, the periodicity of a frame on the control physical channel is different from the periodicity of a frame on a traffic physical channel. The complete transmission of a frame on the control physical channel lasts 1420 ms.

More particularly, the frame is divided into four segments, which are represented one above the other in FIG. 6. The first three have a duration of M=18 elementary timeslots each having the duration d1. Each of these segments is composed of M/2=9 composite timeslots each having a duration d2=40 ms, and each comprising two consecutive elementary timeslots. The fourth segment has a duration of only N=17 such elementary timeslots. It is composed of eight composite timeslots each having the duration d2, and furthermore of an elementary timeslot of duration d1 which constitutes the last elementary timeslot of the frame. In the figure, the numbers indicated above the frames on the uplink or downlink physical channel correspond to the composite slot numbers, except for the last elementary timeslot (in the fourth segment) which bears the number 35.5 so as to signify that this timeslot corresponds to just half a composite timeslot.

The structure of frames of the downlink control channel set up on the frequency $f_{CD}$ is firstly described.

In each segment, there are provided timeslots dedicated to dedicated logical channels SDCCH (standing for Stand-alone Dedicated Control CHannel) denoted Si, for dialogue between a particular mobile terminal and the base station, as well as at least one timeslot dedicated to a broadcasting logical channel PCH (Paging CHannel) denoted P, for waking up the terminals, as well as finally timeslots dedicated to broadcasting logical channels BCCH (Broadcast Control CHannel) denoted Bi, for broadcasting information to all the terminals or to a subgroup of these terminals.

In particular the first and the ninth elementary timeslots are dedicated to an SDCCH channel denoted S11. Likewise the second and the tenth elementary timeslots are dedicated to an SDCCH channel denoted S12. Likewise, finally, the third and the eleventh elementary timeslots are dedicated to an SDCCH channel denoted S13.

Furthermore, the fourth elementary timeslot is dedicated to a PCH channel denoted P, for waking up the terminals.

Finally, the fifth and the thirteenth elementary timeslots are dedicated to a BCCH channel denoted B21. Likewise, the sixth and the fourteenth timeslots are dedicated to a BCCH channel denoted B22. Likewise again, the seventh and the fifteenth timeslots are dedicated to a BCCH channel denoted B23. Likewise, finally, the eighth timeslot is dedicated to a BCCH channel denoted B0, the twelfth timeslot is dedicated to a BCCH channel denoted B1 and the sixteenth timeslot is dedicated to a BCCH channel denoted B2.

Additionally, in the first segment (at the top in FIG. 6) and in the third segment, the last two elementary timeslots (which correspond to the last composite timeslot denoted FSX) are dedicated to frame synchronization.

Furthermore, in the second and in the fourth segment, the seventeenth elementary timeslot is dedicated to the PCH channel denoted P, for waking up the terminals.

Also, finally, in the third segment, the eighteenth elementary timeslot is dedicated to a broadcasting logical channel, denoted PAG, which serves the base station for addressing messages to mobile terminals with which it is not currently communicating (or "paging").

On the frequency $f_{CU}$, the frame structure of the uplink control channel is different. Specifically, a frame of the uplink control channel comprises only SDCCH channels, denoted Si, dedicated to the dialogue between a particular mobile terminal and the base station. The channels Si of the uplink control channel are associated with the corresponding channels Si, (that is to say those bearing the same index i) of the downlink control channel set up on the frequency $f_{CD}$. Stated otherwise, these associated SDCCH channels allow a bidirectional dialogue between a particular mobile terminal and the base station. Moreover, since the channels Si on the frequency $f_{CU}$ are shifted with respect to the corresponding channels Si on the frequency $f_{CD}$, the dialogue can take place in duplex mode. More particularly, the logical channel S11 occupies, on the traffic physical channel set up on the frequency $f_{CU}$, the fifth and thirteenth elementary timeslots to each segment. Moreover, the channel S12 occupies, on this physical channel, the sixth and fourteenth elementary timeslots of each segment. Finally, the channel S13 occupies, on this traffic physical channel, the seventh and fifteenth elementary timeslots of each segment.

The PCH channel, denoted P, intended for waking up the terminals can be allocated either to all the terminals, or to subgroups of these terminals. Preferably, the frame structure on the control physical channel of the new generation system comprises at least one timeslot (in the example, this is a timeslot P of the PCH channel) which is intended to be listened to by all the terminals of the new generation system: during this timeslot, no signal is transmitted on the uplink path by the terminals of this system.

The method according to the invention makes provision for the monitoring, by the base station BTS2 of a mutual help channel of the old generation system. This channel is a simplex channel, which is known and can be used by all the terminals of the old generation system. In certain cases, this same mutual help channel can also be known and used by the mobile terminals of the new generation system. Should the base station BTS2 detect a given pattern transmitted by the mobile terminal TR1 on this mutual help channel, the base station BTS2 allocates a conventional channel emulating the radio interface I1 of the old generation system, for communication with the mobile terminal TR1. The carrying out of such a method allows the base stations of the new generation system, such as BTS2, to allocate a traffic channel emulating the radio interface I1 of the old generation system only when a terminal of the old generation system, such as TR1, is actually in the corresponding cell.

Figure 7:
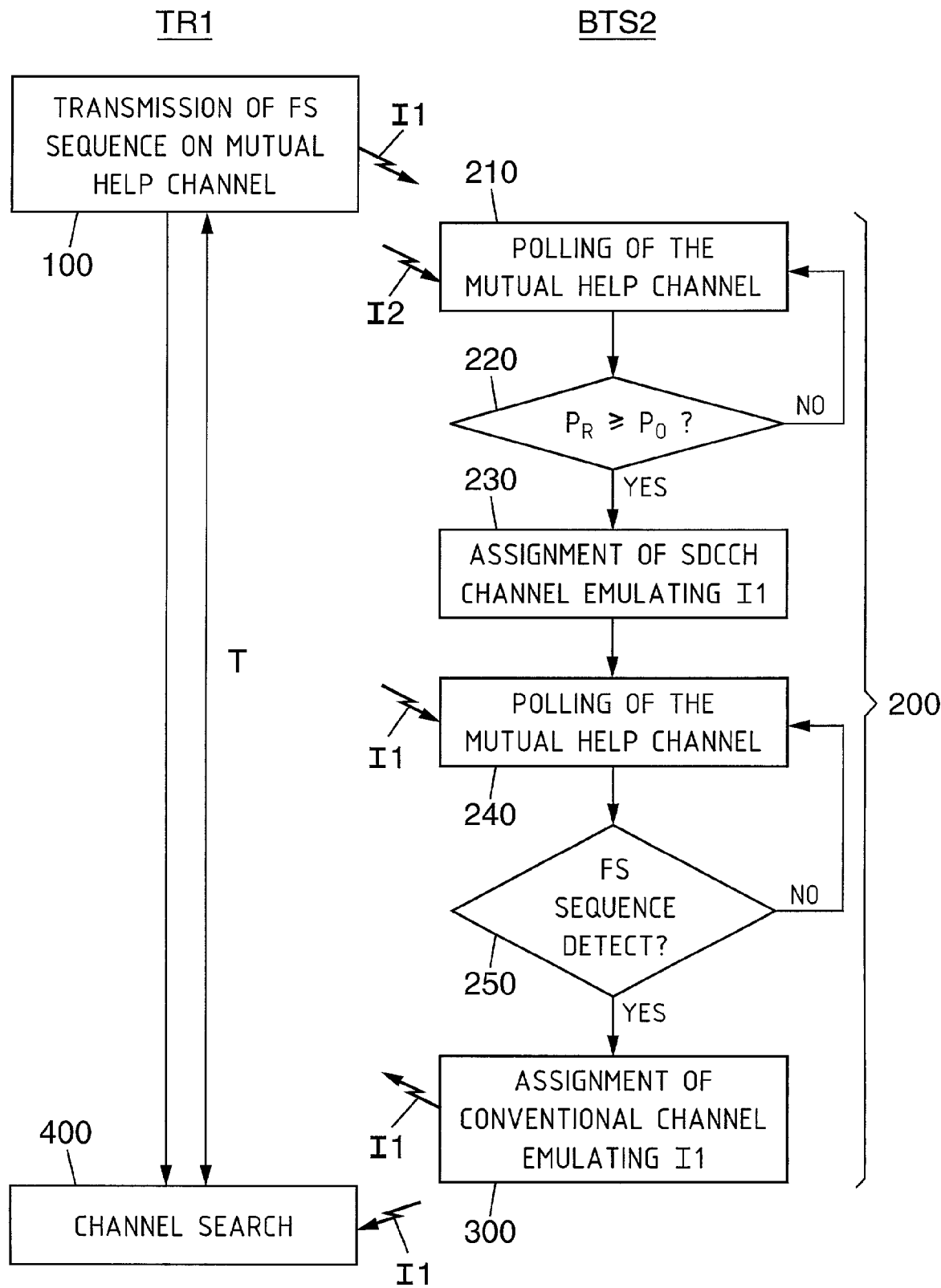
FIG. 7 is a flowchart illustrating a sequence of steps for the allocation of radio resources according to the invention.

Represented in FIG. 7 is a flowchart illustrating a sequence of steps for allocating radio resources dedicated to communication between the terminal TR1 and the base station BTS2 for the establishment of an outgoing call originating from the terminal TR1. The figure depicts the steps implemented by the terminal TR1 of the old generation system, and the steps implemented by the base station BTS2 of the new generation system. The former are represented on the left side of the figure, and the latter are represented on the right side of the figure.

Figure 1:
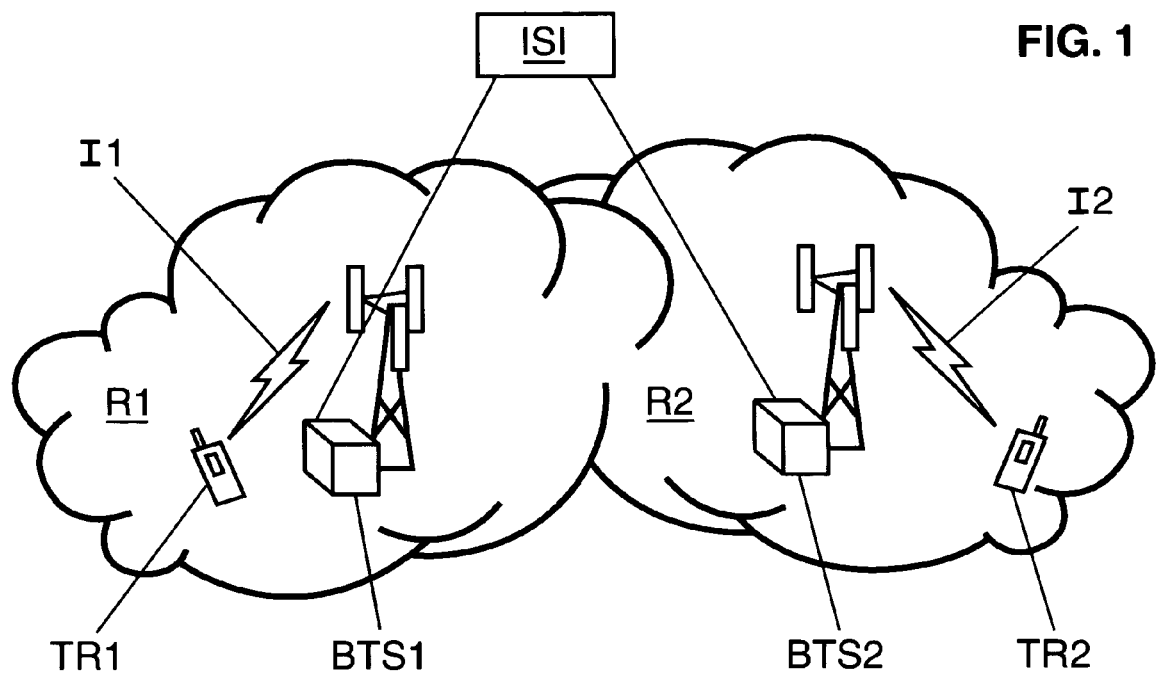
FIG. 1, already analysed is a diagram illustrating the interoperability between two mobile radio systems in a first configuration.
Figure 2:
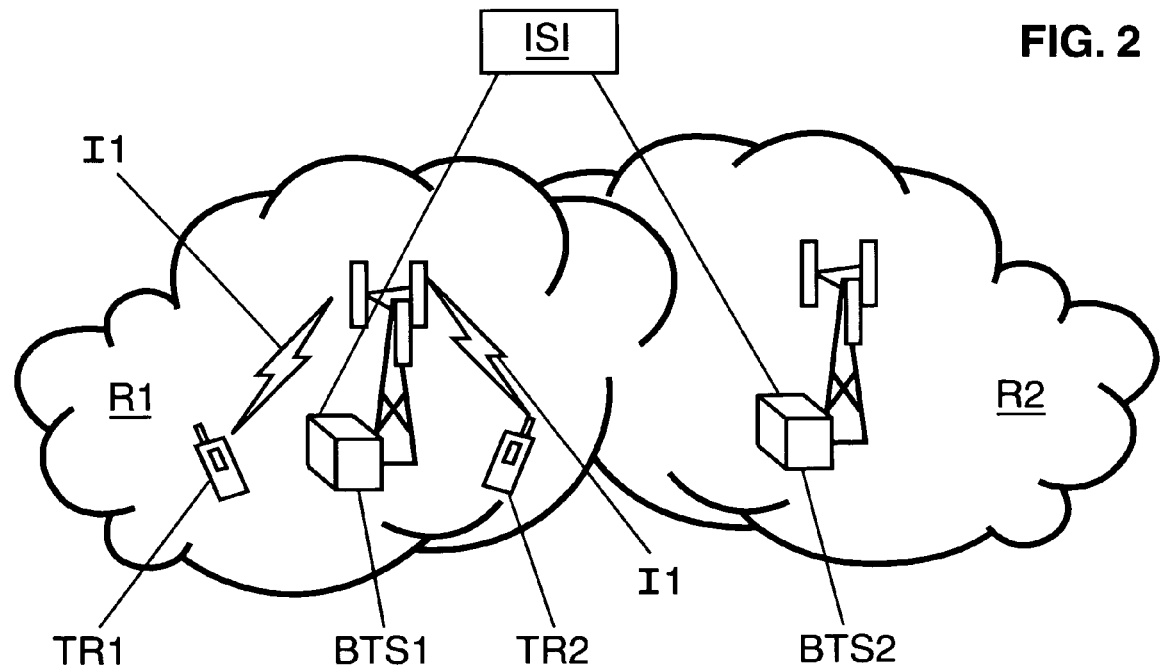
FIG. 2, also already analysed is a diagram illustrating the interoperability between two mobile radio systems in a second configuration.
Figure 3:
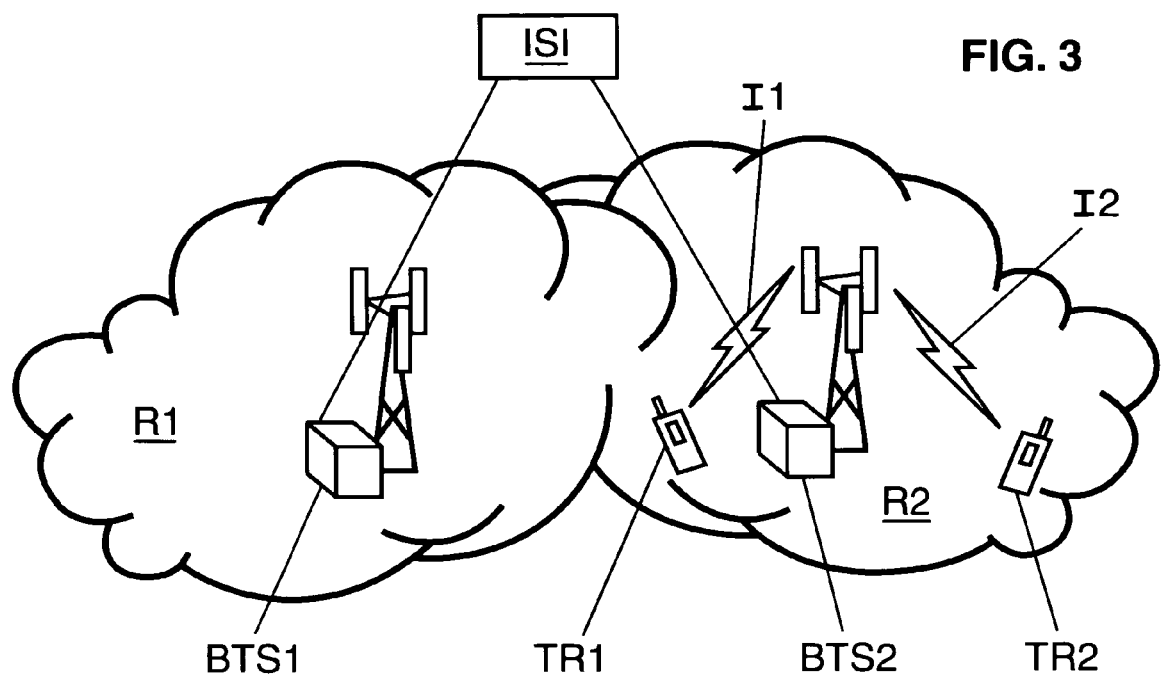
FIG. 3, also already analysed is a diagram illustrating the interoperability between two mobile radio systems in a third configuration.

By assumption, the method according to the invention is implemented in a configuration such as that represented in FIG. 3. In this example, the mobile terminal TR1 has migrated to the area of coverage of the base station BTS2 of the new generation system, so that it has exited the area of coverage of the old generation system.

So, when the user of the terminal TR1 adjusts the rotary switch (control button) of his terminal to a channel search position, the terminal finds no channel (conventional or control channel) available exhibiting the characteristics of the air interface I1. This is indicated to the user, in a manner known per se, for example by a luminous signal on the terminal TR1. The user then adjusts the rotary switch to a position selecting the mutual help channel. The user then presses the "press-to-talk" button for at least a given duration T.

This triggers, in a step 100, the transmission by the terminal TR1 of a signal on the mutual help channel. This signal exhibits a frame structure corresponding to that, presented earlier with regard to FIGS. 4a to 4c, of the traffic physical channel of the old generation system. This signal is, of course, transmitted according to the radio interface I1 of the old generation system. A given pattern is transmitted, with a first periodicity on the mutual help channel. In one example, this pattern consists of the synchronization sequence FS which is inserted into the frame of the traffic physical channel of the old generation system. It is recalled that the periodicity of this sequence FS is equal to 180 ms, since it is equal to K.d1, with K=9 and d1=20 ms.

In a step 200, the base station BTS2 of the new generation system then monitores the mutual help channel of the first system, so as to detect as the case may be the pattern transmitted by the terminal TR1. In a preferred example, the monitoring 200 takes place several times.

In a first substep 210, the base station BTS2 carries out a first monitoring of the mutual help channel in monitoring windows during given periodic timeslots. In the example, this monitoring takes place in at least one of the periodic timeslots P of the downlink control logical channel PCH specific of the base station BTS2. It is recalled that such a timeslot has a duration equal to d1 and a periodicity equal to that of the frame structure on the control physical channel of the first-generation system. It is in fact equal to 1420 ms since it is equal to k".d1, with K"=71 and d1=20 ms.

In a second substep 220, which is in reality concomitant with the substep 210, the base station BTS2 measures the level PR of the power received at the frequency of the mutual help channel during each relevant timeslot P. Preferably, the mobile terminals TR2 of the new generation system are silent during this timeslot P. Stated otherwise, they transmit no signal. This is the case when the relevant timeslot P is a timeslot of a broadcasting channel PCH (control logical channel) intended to be listened to by all the terminals of the new generation system. This measure is useful in particular when the mobile terminals of the new generation system can also transmit on the (same) mutual help channel of the old generation system. In this way, the detection of a certain power level at the frequency of the mutual help channel is an indication of the probable presence of a mobile terminal of the old generation system in the cell. At the very least, it cannot be attributed to the transmission by a mobile terminal of the new generation system on the mutual help channel.

In a third substep 230, the base station BTS2 compares the level $P_R$ with a given threshold $S_0$. If $P_R$ is greater than $S_0$, the base station BTS2 assigns a control logical channel (an SDCCH channel denoted Si, with i=11, i=12 or i=13) which is dedicated to searching, on the mutual help channel, for the given pattern consisting in the example of the synchronization sequence FS transmitted by the terminal TR1 on this channel. During the timeslots dedicated to this SDCCH channel, the base station BTS2 takes into account the characteristics of the radio interface I1 of the old generation system, so as to be able to detect this pattern and adjust itself onto the reception frequency of the said channel.

In a substep 240, the base station BTS2 then monitores the mutual help channel, in the timeslots constituting the SDCCH channel thus assigned. The condition according to which the timeslots of this SDCCH channel have a periodicity which is not proportional to the periodicity with which the given pattern is transmitted by the terminal TR1 on the mutual help channel should be complied with. In fact, in the example, the periodicity of the timeslots of an SDCCH channel is equal to the periodicity of the frame structure on the control physical channel of the first-generation system. Indeed, whether the SDCCH channel allocated to the search for the given pattern is complete (because it consists of the eight elementary timeslots Si of each frame, for a given value of i, for example i=11 or i=12 or i=13) or whether it is fractional (because it consists for example, of four, two or just one of the eight timeslots Si of each frame, for a given value of i, for example i=11 or i=12 or i=13), the periodicity of the timeslot or timeslots constituting this channel is equal to the periodicity K".d1 of the frame structure on the control physical channel, since the number K" is a prime number. It is recalled that this latter periodicity is equal to 1420 ms since it is equal to K".d1, with K"=71 and d1=20 ms. The numbers K and K" being mutually prime, the aforesaid condition is complied with in this example. Therefore, the synchronization sequence FS appears rapidly in one of the base station monitoring windows. It is easily verified that if a complete SDCCH is allocated, this duration does not exceed four periods, i.e. less than 6 seconds and the probability of detection upon the first appearance is high on account of the length of the frame and of the absence of variable information inside the sequence.

Furthermore, the duration T for which the press-to-talk button of the terminal TR1 is pressed should be at least of the order of around 6 seconds, so as to be certain that the synchronization sequence FS is detected by the base station BTS2.

When, in a substep 250, the synchronization sequence is detected, a traffic channel is, in a step 300, allocated by the base station BTS2 for communication with the mobile terminal TR1. For this purpose, the base station BTS2 emulates the radio interface I1 of the old generation system in respect of this conventional channel. This allocation may be automatic, or be controlled by an operator who is forewarned by a message sent by the base station BTS2. This operator is for example the supervisor of the network of the new generation system.

In a step 400, the user again positions the rotary switch of his mobile terminal TR1 to the position for searching for a conventional or control channel. The terminal TR1 then finds, in a conventional manner, the traffic channel which, according to the invention, has been allocated by the base station BTS2 by emulating the interface I1 of the old generation system.

It will be noted that, aside from the allocating of the radio resources for communication between the mobile terminal TR1 and the base station BTS2, the establishment of the communication with the terminal called by the mobile terminal TR1 is carried out in a conventional manner.

The base stations of the new generation system, such as BTS2, comprise means for implementing the method described hereinabove. These means comprise software means and hardware means, in particular means for emulating the air interface I1 of the old generation system.

The invention claimed is:

1. Method for allocating radio resources for the establishment of an outgoing call originating from a mobile terminal of a first system for radiocommunications with mobiles having a given radio interface and a mutual help channel, via a base station of a second system for radiocommunications with mobiles, said second system being distinct from said first system, and said first and second systems comprising respective terminals and base stations and having respective radio interface which are mutually incompatible,
   wherein a given pattern is transmitted periodically by the mobile terminal on the mutual help channel with a first periodicity; and,
   wherein the base station carries out the steps of:
   a) periodically monitoring said mutual help channel of the first system with a control logical channel having timeslots with a second periodicity which is not proportional to said first periodicity, while taking into account the characteristics of the radio interface of the first system; and
   b) in case of detection, by the base station, of the given pattern transmitted by the mobile terminal on said mutual help channel, allocating a traffic channel emulating the radio interface of the first system, for communication with the mobile terminal.

2. Method according to claim 1, wherein step a) comprises:
   monitoring said mutual help channel during given periodic timeslots;
   measuring the power level at the frequency of said mutual help channel during said given periodic timeslots;
   if this power level is greater than a given threshold, assigning the control logical channel dedicated to searching for the given pattern on the mutual help channel; and
   monitoring said mutual help channel during the timeslots of said control logical channel, while taking into account the characteristics of the radio interface of the first system.

3. Method according to claim 2, wherein said given periodic timeslots consist of at least some of the timeslots of a broadcasting logical channel set up on a downlink control physical channel specific to the base station.

4. Method according to claim 2 wherein the mobile terminals of the second system are silent during said given periodic timeslots.

5. Method according to claim 1, wherein the given pattern is a synchronization sequence inserted periodically into the frame of a traffic physical channel of the first system.

6. Method according to claim 1 wherein in step b), the allocation of the traffic channel is automatic.

7. Method according to claim 1, wherein in step b), the allocation of the traffic channel is controlled by an operator.

8. Base station, comprising means for allocating radio resources for the establishment of an outgoing call originating from a mobile terminal of a first system for radiocommunications with mobiles having a given radio interface and a mutual help channel, via a base station of a second system for radiocommunications with mobiles said second system being distinct from said first system, and said first and second systems comprising respective terminals and base stations and having respective radio interface which are mutually incompatible, wherein a given pattern is transmitted periodically by the mobile terminal on the mutual help channel with a first periodicity,
   wherein said means for allocating comprise:
   a) means for periodically monitoring said mutual help channel of the first system with a control logical channel having timeslots with a second periodicity which is not proportional to said first periodicity, while taking into account the characteristics of the radio interface of the first system; and
   b) means for allocating a traffic channel emulating the radio interface of the first system, for communication with the mobile terminal in case of detection of a given pattern transmitted by the mobile terminal on said mutual help channel.

9. Base station according to claim 8, the means for monitoring comprise:
   means for monitoring said mutual help channel during given periodic timeslots;
   means for measuring the power level at the frequency of said mutual help channel during said given periodic timeslots;
   means for assigning the control logical channel dedicated to searching for the given pattern on the said mutual help channel, if the power level is greater than a given threshold; and
   means for monitoring said mutual help channel during the timeslots of said control logical channel, while taking into account the characteristics of the radio interface of the first system.

10. System for radiocommunications with mobiles having a first given radio interface and comprising at least one base station, wherein the base station has means for allocating radio resources for the establishment of an outgoing call originating from a mobile terminal of another system for radiocommunications with mobiles having a second given radio interface which is incompatible with said first given radio interface, wherein a given pattern is transmitted periodically by the mobile terminal on the mutual hem channel with a first periodicity, and having a mutual help channel, said systems comprising respective terminals and base stations, and wherein the means for allocating comprise:

a) means for periodically monitoring said mutual help channel of the other system with a control logical channel having timeslots with a second periodicity which is not proportional to said first periodicity, while taking into account the characteristics of the radio interface of the first system; and b) means for allocating a traffic channel emulating the radio interface of the other system, for communication with the mobile terminal in case of detection of a given pattern transmitted by the mobile terminal on said mutual help channel.

11. System according to claim 10, the means for monitoring comprise:

means for monitoring said mutual help channel during given periodic timeslots;

means for measuring the power level at the frequency of said mutual help channel during said given periodic timeslots;

means for assigning the control logical channel dedicated to searching for the given pattern on the said mutual help channel, if the power level is greater than a given threshold; and means for monitoring said mutual help channel during the timeslots of said control logical channel, while taking into account characteristics of the radio interface of the system.

* * * * *